United States Patent
Stark et al.

(10) Patent No.: US 8,398,142 B2
(45) Date of Patent: Mar. 19, 2013

(54) VEHICLE SEAT

(75) Inventors: Andreas Stark, Wuppertal (DE); Erik Sprenger, Remscheid (DE); Andreas Weiss, Wolfsburg (DE)

(73) Assignees: Johnson Controls GmbH, Burscheid (DE); Volkswagen AG, Wolfsburg (DE)

( * ) Notice: Subject to any disclaimer, the term of this patent is extended or adjusted under 35 U.S.C. 154(b) by 1515 days.

(21) Appl. No.: 10/580,129

(22) PCT Filed: Oct. 1, 2004

(86) PCT No.: PCT/EP2004/010970
§ 371 (c)(1),
(2), (4) Date: May 19, 2006

(87) PCT Pub. No.: WO2005/049368
PCT Pub. Date: Jun. 2, 2005

(65) Prior Publication Data
US 2010/0213733 A1     Aug. 26, 2010

(30) Foreign Application Priority Data
Nov. 19, 2003 (DE) .................................. 103 54 065

(51) Int. Cl.
*B60N 2/02* (2006.01)
*B60N 2/005* (2006.01)

(52) U.S. Cl. ................. 296/65.05; 296/65.09; 297/321; 297/341

(58) Field of Classification Search ............. 296/63, 296/65.01, 66, 65.05, 65.09, 65.19, 69, 698; 297/319, 321, 341, 378.12
See application file for complete search history.

(56) References Cited

U.S. PATENT DOCUMENTS

| | | | | |
|---|---|---|---|---|
| 2,956,837 A | * | 10/1960 | Koplin | 296/66 |
| 3,311,405 A | * | 3/1967 | Brennan et al. | 296/66 |
| 3,807,790 A | | 4/1974 | Erard | |
| 5,482,349 A | * | 1/1996 | Richter et al. | 297/15 |
| 5,542,747 A | * | 8/1996 | Burchi | 297/452.55 |
| 5,570,931 A | * | 11/1996 | Kargilis et al. | 297/378.12 |

(Continued)

FOREIGN PATENT DOCUMENTS

| DE | 198 45 730 A1 | 7/1999 |
|---|---|---|
| DE | 199 33 423 A1 | 1/2001 |

(Continued)

OTHER PUBLICATIONS

International Search Report for. EP2004/010970, mailing date Jan. 12, 2005, 3 pages.

*Primary Examiner* — Glenn Dayoan
*Assistant Examiner* — Melissa A Black
(74) *Attorney, Agent, or Firm* — Foley & Lardner LLP

(57) ABSTRACT

Provided is a vehicle seat which is positionable between a use and not-it-use position convenient for increased storage space and access to rearward areas of the vehicle. The vehicle seat includes a seat part and a backrest. The seat part is pivotably coupled to the vehicle floor at one end so that that the seat part may be moved frontward with respect to the vehicle. A transmission link is provided, coupled to the backrest and the seat part so that the backrest pivots into the not-in-use position as the seat part is moved into its not-in-use position.

28 Claims, 5 Drawing Sheets

U.S. PATENT DOCUMENTS

| | | | |
|---|---|---|---|
| 5,588,707 A * | 12/1996 | Bolsworth et al. | 297/378.12 |
| 5,882,073 A | 3/1999 | Burchi et al. | |
| 6,000,742 A * | 12/1999 | Schaefer et al. | 296/65.09 |
| 6,135,558 A * | 10/2000 | Behrens et al. | 297/353 |
| 6,598,926 B1 * | 7/2003 | Price et al. | 296/65.09 |
| 7,469,952 B2 * | 12/2008 | Luttinen et al. | 296/65.09 |

FOREIGN PATENT DOCUMENTS

| | | |
|---|---|---|
| DE | 199 62 424 C1 | 8/2001 |
| EP | 0 985 575 A2 | 3/2000 |
| EP | 1336361 A1 | 8/2003 |
| JP | 08318769 | 12/1993 |

* cited by examiner

VEHICLE SEAT

CROSS-REFERENCE TO RELATED APPLICATIONS

The present Application is a National Phase Application of PCT/EP2004/010970 entitled, "Vehicle Seat, Especially for a Motor Vehicle" filed on Oct. 1, 2004 which published under PCT Article 21(2) on Jun. 5, 2005 as WO2005/049368 A1 in the German language, which claims priority to German Patent Application DE 103 54 065.2 filed Nov. 19, 2003, the entire disclosure of which, including the specification and drawings, is expressly incorporated herein by reference.

BACKGROUND

The invention relates to a vehicle seat for a motor vehicle, with a seat part made of a hard foam part and a soft foam pad.

A vehicle seat upholstery part is known from patent application DE 198 45 730 A1. The upholstery part is designed as a backrest, which has a sandwich construction and is composed of a shaped foam part of EPP, a soft cushion and a light metal shell situated therebetween. The shaped foam part is covered on the rear side by a rear wall element.

An upholstery part of this type is suitable, in principle, for reducing the weight of the vehicle compared to seats with conventional steel structures. However, the selected construction is suitable only for use in the case of backrests and, in addition, it is still relatively heavy because of the metal shell mold used.

Therefore, it is desirable to provide a vehicle seat which is further reduced in weight and is simple to manufacture.

SUMMARY

In one exemplary embodiment, a vehicle seat for a motor vehicle includes an upholstery part made of a hard foam part and a soft foam pad. The upholstery part is designed as a seat part. The hard foam part defines a first surface partially shaped congruently to a vehicle floor. The seat part can be configured in a use position and the seat part is configured to fit with the vehicle floor when in the use position. A hinge mechanism is configured to release the seat part from the vehicle floor and shift the seat part toward a not-in-use position.

In one exemplary embodiment, a vehicle seat includes a backrest and a seat part selectively coupled to a vehicle floor and the seat part is configured to abut an end of the backrest in a use position. The backrest is configured to recline with respect to the seat part. A transmission link is coupled to the backrest. A hinge mechanism is coupled to the seat part and the transmission link, configured to enable the seat part to at least partially pivot about the hinge mechanism. The hinge mechanism is coupled to a pinion gear engageable with the transmission link in a manner so that pivoting the seat back causes the seat part to pivot about the hinge mechanism.

In another exemplary embodiment, a vehicle having an interior at least partially defined by a vehicle floor, the floor including a protrusion, includes a seat assembly, selectively coupled to the vehicle floor and a backrest included in the seat assembly. A seat part is included in the seat assembly configured to pivot with respect to the backrest at one end between a use position and a stow or not-in-use position. The backrest is further configured to rotate in a frontward direction, toward the seat part, into a not-in-use position. A transmission link is coupled to the backrest for moving the seat part. A hinge mechanism is coupled to the seat part and transmission link, configured to enable the seat part to at least partially pivot about the hinge mechanism. The hinge mechanism is coupled to a pinion gear engageable with the transmission link in a manner to pivot the seat back in response to the seat part pivoting about the hinge mechanism. The seat part defines a recess configured to selectively juxtapose the recess of the seat part.

The vehicle seat is designed as a seat part and the hard foam part has a surface which, at least in some regions, is shaped congruent to the vehicle floor and, in the use position of the seat part, can be brought into a positive fit with the vehicle floor, the seat part being releasable from the positive fit and being shiftable into a not-in-use position by means of a hinge mechanism.

This design makes it possible to dispense with a solid hinge mechanism for the seat part that, in particular in the event of a crash, conducts away the weight of the vehicle occupant into the vehicle structure. On the contrary, the forces are transmitted by the positive fit directly from the hard foam part into the vehicle floor, with the result that the hinge mechanism serves only to guide the movement of the seat part. It is therefore possible to secure the seat part directly in the hard foam part, i.e. dispensing with a metallic supporting structure arranged in the seat part.

In one embodiment, the hard foam part is preferably composed of expanded polypropylene particle foam (EPP) from which complex, three-dimensional shaped parts of low weight can be produced cost-effectively.

The positive fit can advantageously be produced between a surface of the vehicle floor, which surface extends vertically essentially transversely with respect to the driving direction, and a surface of the hard foam part, which runs parallel to the vehicle floor. The surface of the vehicle floor preferably includes a support-like arch running horizontally and transversely with respect to the direction of travel. The surface of the hard foam part defines part of a first recess, which runs in the direction of travel, in the hard foam part.

According to one exemplary embodiment, the hinge mechanism comprises a hinge arm which is connected at one end in an articulated manner to the vehicle floor and is connected at its other end in an articulated manner to the hard foam part of the seat in such a manner that the seat part can be brought out of its use position into a not-in-use position shifted parallel thereto. The seat part is therefore not folded from its use position into the not-in-use position but rather the same surface side always faces the vehicle floor. In this case, both hinges preferably have an axis of rotation extending in the direction of travel. The hinge is coupled to the hard foam part, in the use position of the seat part, and offset rearward in a direction counter to the direction of travel in relation to the hinge assigned to the vehicle floor.

In order to simplify the initial installation, but also a fixing of the seat part after it has been temporarily removed, it can be provided that the hinge coupled to the hard foam part can be latched therein during installation of the seat part.

In order also to secure the position of the seat part in the not-in-use position the seat part can preferably be brought into a positive fit with the arch of the vehicle floor by means of a second recess in the hard foam part. In this case, the first and second recesses may naturally have contours which largely correspond and are offset in a direction parallel to one another.

In order, in the event of a crash, to prevent the vehicle occupant from slipping through under the lap belt, the upper side of the hard foam part is preferably designed such that it drops rearward at an include. In this case, a virtual straight line running between the surface of the first recess and the ischial tuberosity (or the "tail bone") of the seat occupant is advantageously inclined by an angle of 25° to 35°. In one exemplary embodiment, the angle is approximately 30°, with respect to the horizontal in order to conduct away the forces of inertia, which are caused by the weight of the seat occupant in the event of a crash. The weight may optimally be transferred into the structure of the vehicle floor.

It can be provided that the seat part is operatively connected to a pivotably mounted backrest of the vehicle seat in such manner that, when the backrest is folded forward from the upright use position into a not-in-use position, the seat part is shifted from the use position into the not-in-use position.

This is preferably brought about by the backrest being connected rotatably to a transmission linkage which is offset with respect to the pivot axis of the backrest. In this case, the transmission linkage can be equipped at its end assigned to the hinge arm with a rack-like toothing (or pinion gear) which is suitable, in conjunction with a gear formed on the hinge arm, for producing a torque about one of its hinges. The mating toothing is advantageously formed in the region of that hinge of the hinge arm which is assigned to the vehicle floor.

BRIEF DESCRIPTION OF THE FIGURES

The figures illustrate an embodiment of the invention by way of example.

DETAILED DESCRIPTION

Figure 1:
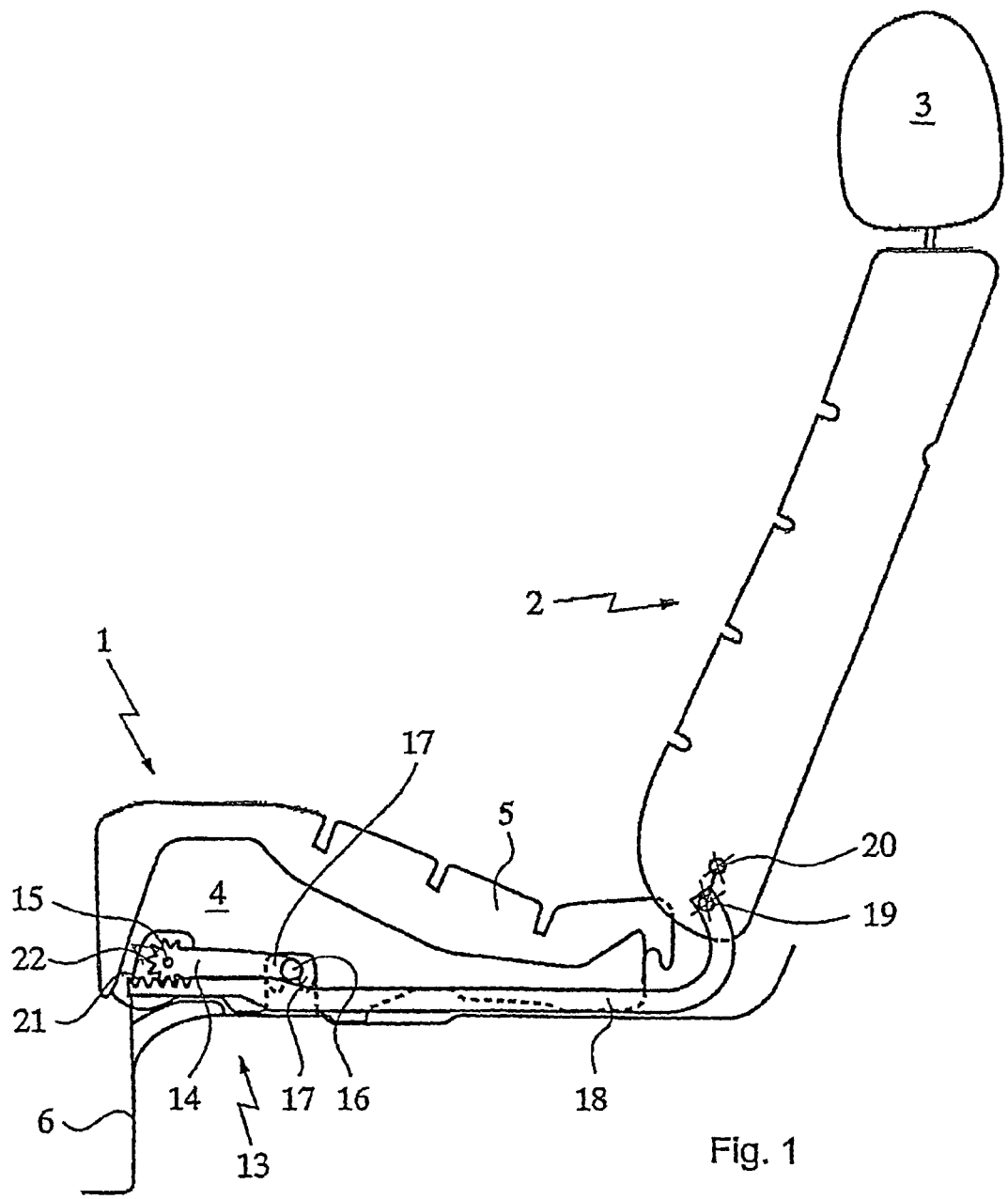
FIG. 1 is a schematic depiction of the vehicle seat in a use position according to an exemplary embodiment.

A vehicle seat assembly as illustrated in FIGS. 1-4 comprises a seat part 1 and a backrest 2 which is provided with a head restraint 3. The seat part 1 is composed of a hard foam part 4 made of EPP which drops on the upper side at an incline. The seat part 1 on its side facing the seat occupant, is provided with a soft foam pad 5 made of polyurethane foam. The soft foam is covered at the end with a textile or leather cover (not illustrated).

Figure 1A:
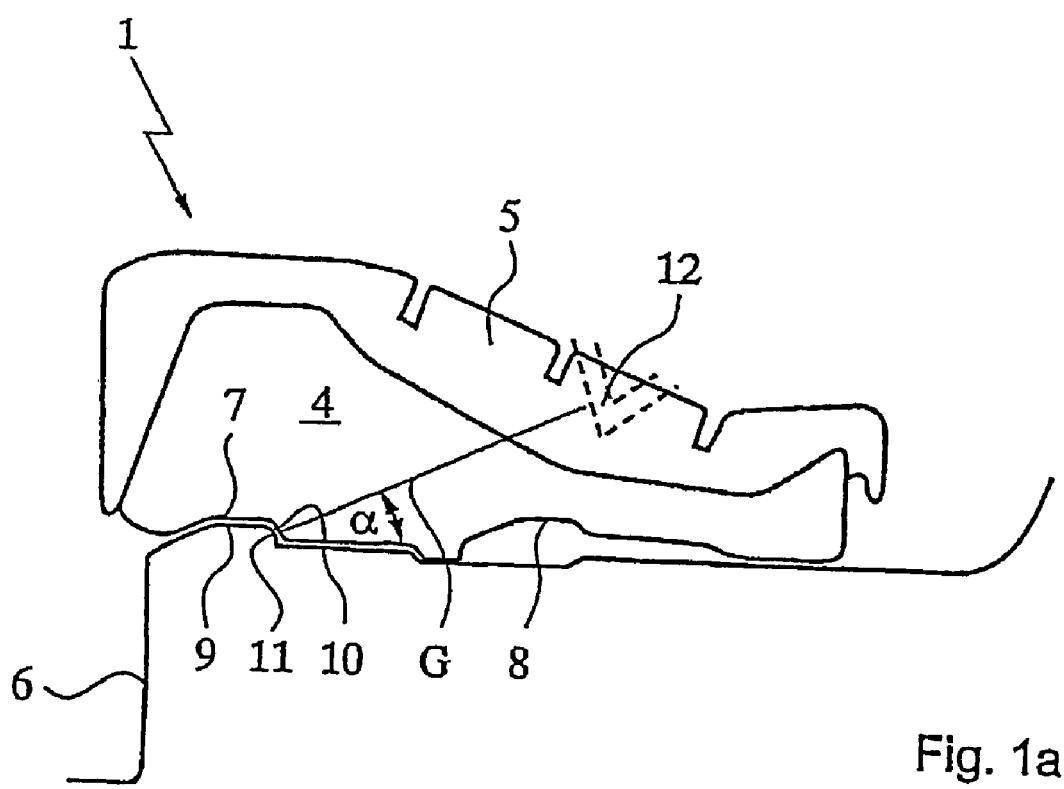
FIG. 1a is a partial schematic depiction of a seat part of the vehicle seat in the use position according to an exemplary embodiment.

As illustrated in FIG. 1a, the lower side of the hard foam part 4, which rests on the vehicle floor 6, is provided with recesses 7, 8 which are distanced from each other in the direction of travel (or a forward direction). The recesses 7, 8 are essentially identical in contour. The front recess 7 engages with a positive fit around a support-like forward arch 9 (or protrusion) in the vehicle floor 6. In this exemplary embodiment, at least one surface 10 of the recess 7, which is defined by an approximately vertical axis and an axis running transversely with respect to the direction of travel, bears against a surface 11, which runs parallel, to the vehicle floor 6 in such a manner that shearing forces acting on the seat part 1 in the direction of travel are transferred into the vehicle floor. The transmission, by means of a positive fit, of centrifugal forces may additionally also occur by the formation of further correspondingly turned surfaces. It is likewise conceivable to place the seat part onto pins protruding from the vehicle floor. The surface structures on the vehicle floor 6 and seat part 1 that are suitable, by means of surface contact, for the transmission of corresponding shearing forces.

In order to avoid a tilting of the seat part 1 in the event of a crash, the straight line, G, runs between the center of the contact region of the surface 10 and the ischial tuberosity 12, which is sunk into the soft foam pad 5, at an angle $\alpha$ (which is approximately equal to 30° with respect to the horizontal). The surface 10 is oriented orthogonally with respect to line G, and is therefore inclined by 60° with respect to the horizontal and runs substantially vertically.

To counteract a torque occurring about the contact region of surfaces 10, 11, the rear region of the seat part 1 is pushed under the backrest 2 and is pulled out of this means of securing during transfer into the not-in-use position (as shown in FIG. 1). The hinge mechanism 13 used for this comprises a hinge arm 14 which is oriented horizontally in the use position of the seat part and is connected rotatably via a first hinge 15 to the vehicle floor 6 and via a second hinge 16 to the hard foam part 4 of the seat part 1. For the insertion of the seat part, with the hinge arm 14 fitted on the vehicle floor 6, the hinge 16 can be latched into a clip connection 17 of the hard foam part 4. The clip connection 17 is screwed down directly in the hard foam part 4. Since the hinge mechanism 13 only has to absorb the weight of the seat part 1 as it shifts into the not-in-use position, high-strength inserts in the seat part 1 can be eliminated.

Figure 2:
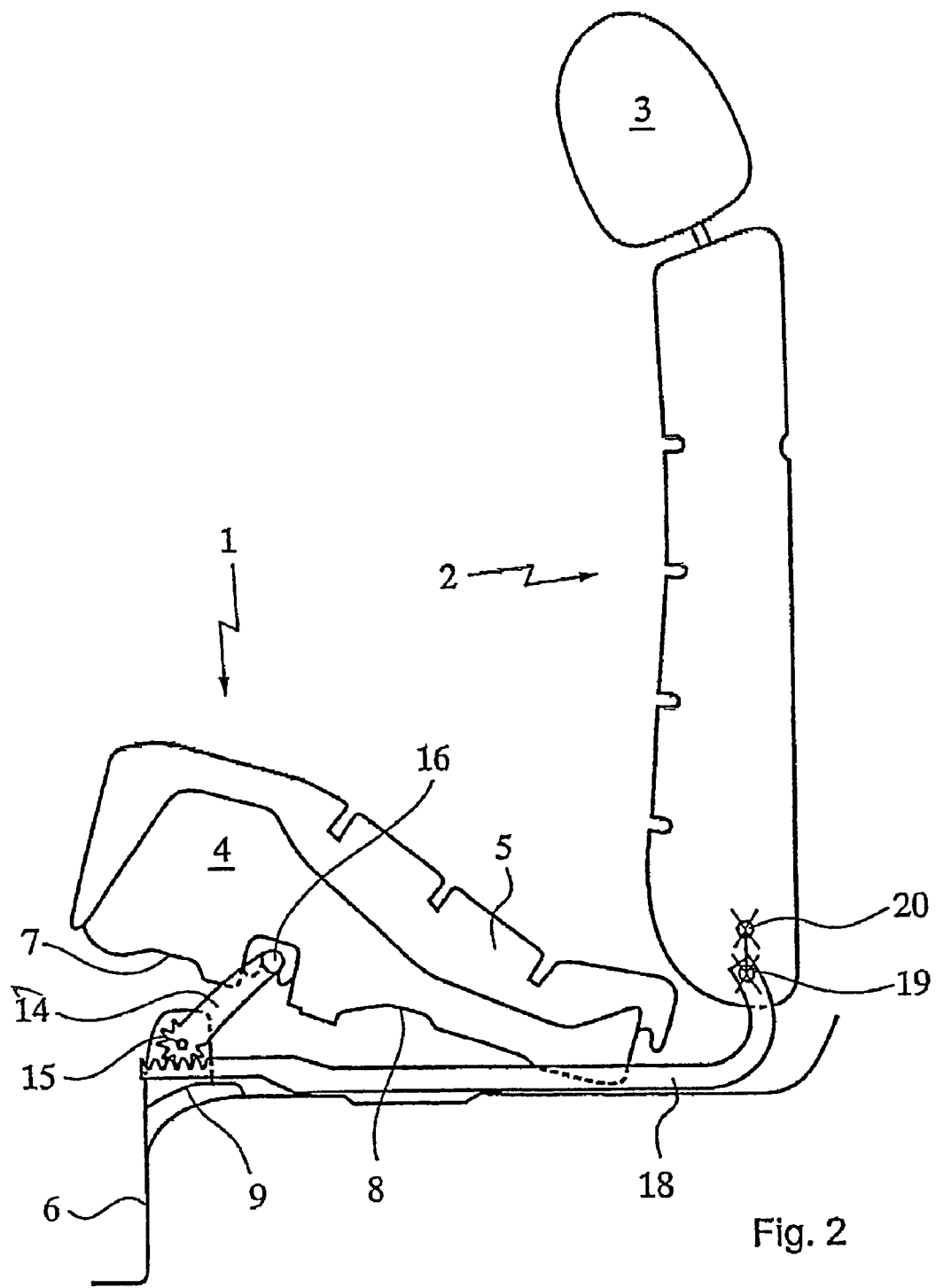
FIGS. 2-3 are schematic depictions of the vehicle seat in several intermediate positions according to an exemplary embodiment.
Figure 3:
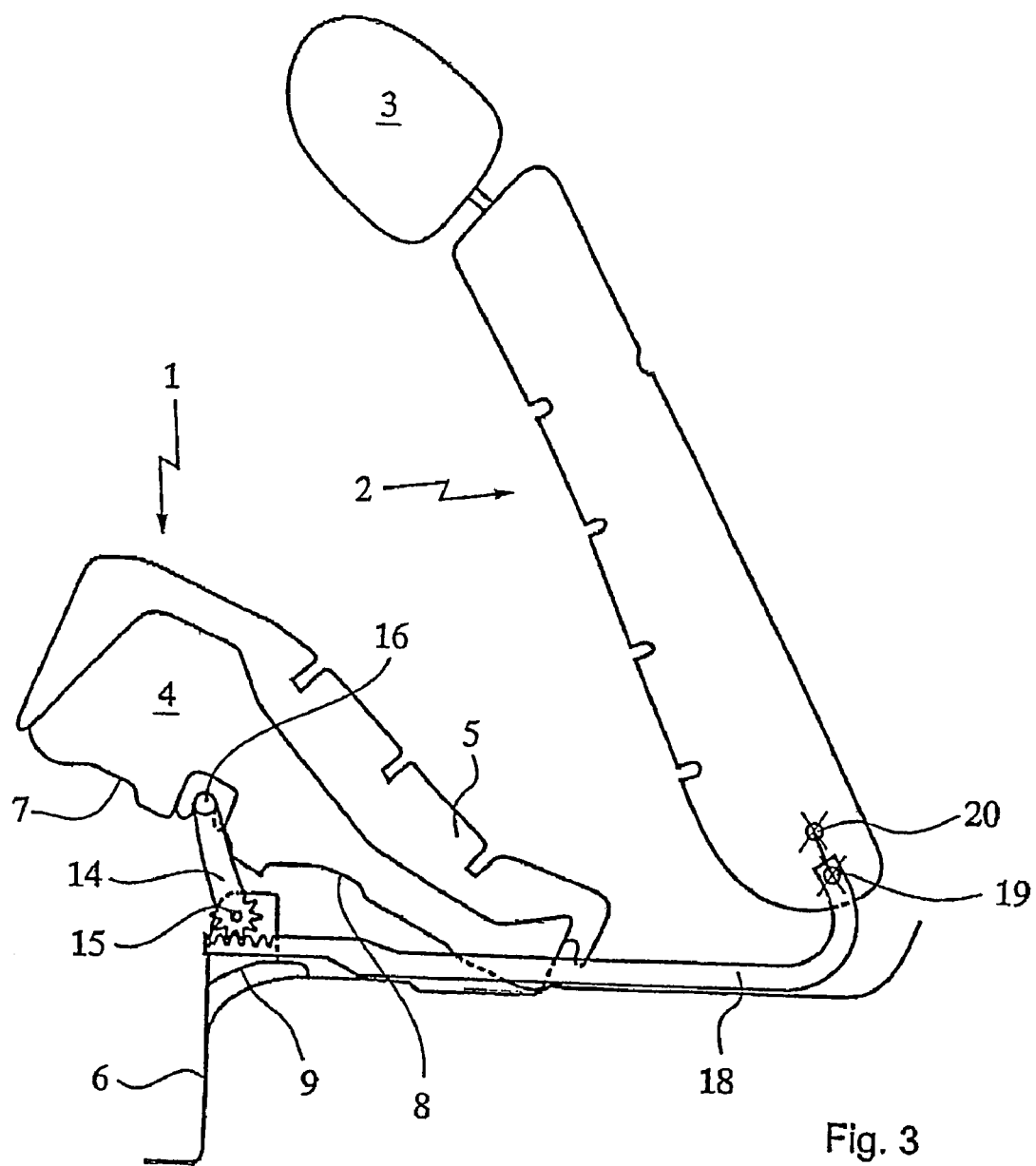
Figure 4:
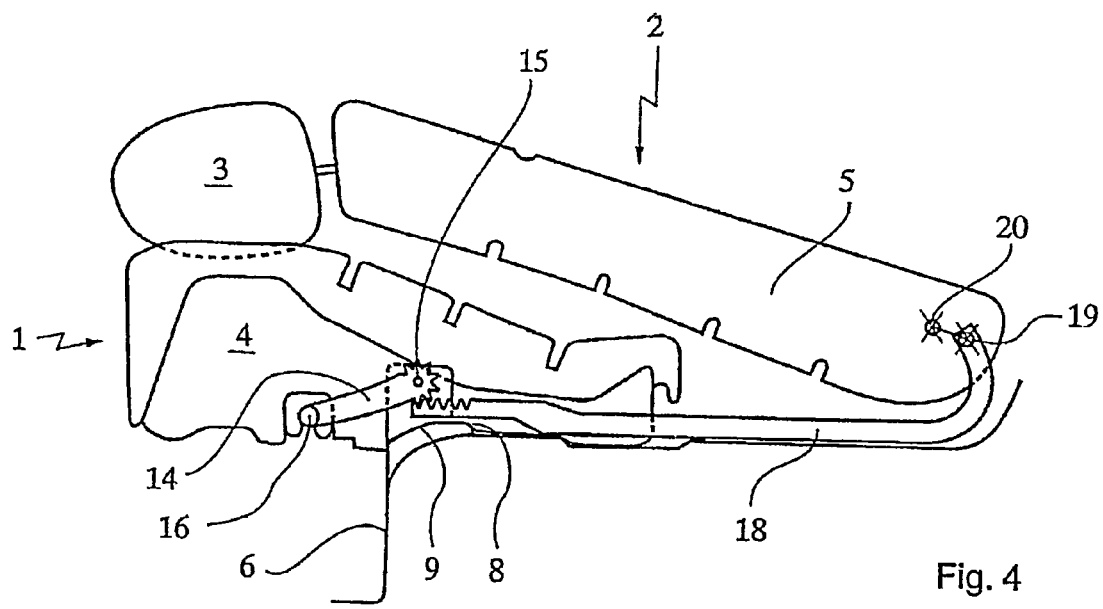
FIG. 4 is a schematic depiction of the vehicle seat in a not-in-use position according to an exemplary embodiment.

The coupling of the movement of the backrest 2 and seat part 1 is brought about by a transmission linkage 18 which is shaped in the manner of a 'J' and is mounted rotatably on the backrest 2 to a hinge 19 in a manner to offset downward in relation to the pivot axis 20. When the backrest 2 is folded forward (as shown in FIGS. 2-4), the transmission linkage 18 is displaced rearward counter to the direction of travel. The front end of the transmission linkage 18 has rack-like toothing 21 which is configured to engage with a circularly designed mating toothing 22 (or gear) on the hinge arm 14 and pivots the latter forward about the hinge 15 in the space above the vehicle floor 6. In the process, the seat part 1 is raised in the front region by the hinge arm 14, with the front recess 7 being moved essentially upward in relation to the forward arching 9 and its rear end, which is mounted displaceably in a rail guide (not illustrated), being pulled forward under the backrest 2.

When the not-in-use position is reached (as shown in FIG. 4), the seat part 1 is again in a horizontal position, i.e. it has been shifted in a direction parallel in relation to the use position. In this case, the rear recess 8 is placed onto the support-like forward arching 9 of the vehicle floor 6 with a positive fit by a substantially downwardly directed movement during the last stage of the sequence, with the hinge arm 14 again taking up a horizontal position in which it is rotated through 180° in relation to the initial position.

The hard foam part is preferably composed of expanded polypropylene particle foam (EPP) from which complex, three-dimensional shaped parts of low weight can be produced cost-effectively.

While the exemplary embodiments illustrated in the FIGS. and described above are presently preferred, it should be understood that these embodiments are offered by way of example only. For example, the teachings herein can be applied to any seat and are not limited to a vehicle seat. Accordingly, the present seat is not limited to a particular embodiment, but extends to various modifications that nevertheless fall within the scope of the appended claims.

The invention claimed is:

1. A vehicle seat for a motor vehicle, comprising:
an upholstery part made of a hard foam part and a soft foam pad, wherein the upholstery part is designed as a seat part having a top surface and a bottom surface, wherein the hard foam part defines a first surface at the bottom surface of the seat part, the first surface having a first portion shaped to be congruent to a contour of an upper surface of a vehicle floor, wherein the seat part is configured to be switchable between a use position with the first portion of the first surface of the hard foam part being configured to positively engage with the contour of the upper surface of the vehicle floor when in the use position, and a not-in-use position such that the bottom surface of the seat part remains vertically below the top surface of the seat part when in the use position and when in the not-in-use position; and a hinge mechanism configured to release the first portion of the seat part from the vehicle floor and shift the seat part into the not-in-use position, wherein the hinge mechanism comprises a first hinge arm connected at a first end to the vehicle floor and a first hinge connecting a second end of the first hinge arm to the hard foam part, wherein the first hinge is pivotable about a first axis, wherein the first hinge is latched to the hard foam part via a connection directly affixed to material of the hard foam part, and wherein the hinge mechanism is connected to the seat part such that the hinge mechanism does not transfer weight of a vehicle occupant into the vehicle floor during a crash.

2. The vehicle seat of claim 1, wherein the hard foam part is composed of expanded polypropylene particle foam.

3. The vehicle seat of claim 1, wherein the upper surface of the vehicle floor includes a portion which extends vertically and essentially transversely with respect to a direction of travel of the vehicle; and wherein the first portion of the first surface of the hard foam part extends approximately parallel to the portion of the upper surface.

4. The vehicle seat of claim 3, wherein the portion of the upper surface of the vehicle floor comprises an arch, the arch running approximately horizontal and transverse with respect to the direction of travel; and wherein the first portion of the first surface of the hard foam part includes a first recess, which runs approximately parallel to the arch.

5. The vehicle seat of claim 4, wherein the first surface of the hard foam part has a second portion, and wherein the second portion of the first surface of the hard foam part includes a second recess configured such that the arch of the vehicle floor fits within the second recess when in the not-in-use position.

6. The vehicle seat of claim 4, wherein the first recess may be inclined at an angle between 25° to 35° with respect to a horizontal axis.

7. The vehicle seat of claim 1, wherein the first end of the first hinge arm is connected in an articulated manner to the vehicle floor and the second end of the first hinge arm is connected in an articulated manner to the hard foam part via the connection such that the seat part moves out of the use position into the not-in-use position, approximately parallel to the seat part in the use position.

8. The vehicle seat of claim 7, wherein the hinge mechanism includes a second hinge pivotable about a second axis, wherein the second hinge is coupled to the vehicle floor.

9. The vehicle seat of claim 8, wherein the seat part is operatively connected to a pivotably mounted backrest of the vehicle seat such that, when the backrest is folded forward from a use position into a not-in-use position, the seat part also shifts from the use position of the seat part into the not-in-use position of the seat part.

10. The vehicle seat of claim 9, wherein the backrest is connected rotatably to a transmission linkage offset with respect to a pivot axis of the backrest, and wherein the backrest is connected to the transmission linkage by a second hinge arm.

11. The vehicle seat of claim 10, wherein the transmission linkage includes, at an end coupled to the first hinge arm, a rack-like toothing suitable, in conjunction with a circular mating toothing formed on the first hinge arm, for producing a torque about any one of the first hinge and the second hinge.

12. The vehicle seat of claim 11, wherein the mating toothing is coupled to the second hinge which is also coupled to the vehicle floor.

13. The vehicle seat of claim 7, wherein the hard foam part is configured to pivot downward so that the seat part is positionable at an incline.

14. The vehicle seat of claim 1, wherein the hinge mechanism is connected to the seat part such that the hinge mechanism only has to absorb the weight of the seat part while the seat part transitions from the use position to the not-in-use position.

15. A vehicle seat for use in a vehicle having an interior with a vehicle floor, comprising:

a backrest;

a seat part configured to be selectively coupled to the vehicle floor and configured to abut an end of the backrest in a use position, wherein the backrest is configured to recline with respect to the seat part in a rearward direction, away from the seat part, and wherein the backrest is further configured to rotate in a frontward direction, toward the seat part;

a transmission link coupled to the seat part and backrest; and a hinge mechanism coupled to the seat part and the transmission link, and configured to enable the seat part to at least partially pivot about the hinge mechanism;

wherein the hinge mechanism is coupled to a pinion gear engageable with the transmission link in a manner to pivot the seat back in response to the seat part pivoting about the hinge mechanism;

wherein the seat part comprises a first recess configured to receive a protrusion from the vehicle floor and a second recess configured to receive the same protrusion when in a configuration different from when the first recess receives the protrusion, and wherein the hinge mechanism is connected to the seat part such that the hinge mechanism does not transfer weight of a vehicle occupant into the vehicle floor during a crash.

16. The vehicle seat of claim 15, wherein the seat part is configured to pivot in the frontward direction into a not-in-use position, coplanar with the use position.

17. The vehicle seat of claim 16, wherein the seat part comprises a hard part to which the hinge mechanism is coupled, and wherein the seat part further comprises a soft pad coupled to the hard part.

18. The vehicle seat of claim 17, wherein the protrusion is configured to be inserted into the second recess when the seat part is positioned in the not-in-use position.

19. The vehicle seat of claim 15, wherein the transmission link is configured to pivot the backrest in the frontward direction as the seat part pivots in the frontward direction.

20. The vehicle seat of claim 19, wherein the transmission link is configured to pivot the backrest in the rearward direction as the seat part pivots in the rearward direction.

21. The vehicle seat of claim 15, wherein the first recess is configured to receive the protrusion from the vehicle floor in the use position of the seat part and the second recess is configured to receive the protrusion from the vehicle floor in a not-in-use position.

22. A vehicle comprising:
an interior at least partially defined by a vehicle floor, wherein the vehicle floor includes a protrusion; and
a seat assembly, selectively coupled to the vehicle floor; wherein the seat assembly comprises:
a backrest;
a seat part configured to pivot with respect to the backrest at one end between a use position and a not-in-use position, wherein the backrest is further configured to rotate in a frontward direction, toward the seat part, into a not-in-use position;
a transmission link coupled to the seat part and backrest; and
a hinge mechanism coupled to the seat part and transmission link, and configured to enable the seat part to at least partially pivot about the hinge mechanism;
wherein the hinge mechanism is coupled to a pinion gear engageable with the transmission link in a manner to pivot the seat back in response to the seat part pivoting about the hinge mechanism;
wherein the seat part defines a first recess into which the protrusion of the vehicle floor is configured to be inserted and a second recess into which the same protrusion is configured to be inserted when in a configuration different from when the protrusion is inserted into the first recess,
wherein the hinge mechanism is connected to the seat part such that the hinge mechanism does not transfer weight of a vehicle occupant into the vehicle floor during a crash.

23. The vehicle of claim 22, wherein the backrest is further configured to recline with respect to the seat part in a rearward direction, away from the seat part.

24. The vehicle of claim 23, wherein the seat part is configured to pivot in the frontward direction into the not-in-use position of the seat part, coplanar with the use position of the seat part.

25. The vehicle of claim 22, wherein the seat part comprises a hard part to which the hinge mechanism is coupled, and wherein the seat part further comprises a soft pad coupled to the hard part.

26. The vehicle of claim 22, wherein the transmission link is configured to pivot the backrest in the frontward direction as the seat part pivots in the frontward direction.

27. The vehicle of claim 22, wherein the protrusion of the vehicle floor is configured to be inserted into the first recess in the use position of the seat part and into the second recess in the not-in-use position of the seat part.

28. A vehicle seat for a motor vehicle, comprising:
an upholstery part made of a hard foam part and a soft foam pad, wherein the upholstery part is designed as a seat part, wherein the hard foam part defines a first surface having a first portion shaped to be congruent to a contour of an upper surface of a vehicle floor, wherein the seat part is configured to be switchable between a use position with the first portion of the first surface of the hard foam part being configured to positively engage with the contour of the upper surface of the vehicle floor when in the use position, and a not-in-use position; and
a hinge mechanism configured to release the first portion of the seat part from the vehicle floor and shift the seat part into the not-in-use position,
wherein the hinge mechanism is connected to the seat part such that the hinge mechanism does not transfer weight of a vehicle occupant into the vehicle floor during a crash, and
wherein the first surface has a second portion, the second portion being configured to positively engage with the contour of the upper surface of the vehicle floor when in the not-in-use position.

* * * * *